V. MULHOLLAND.
APPARATUS FOR HANDLING GLASSWARE.
APPLICATION FILED JUNE 24, 1908.
1,053,631.
Patented Feb. 18, 1913.
5 SHEETS—SHEET 3.
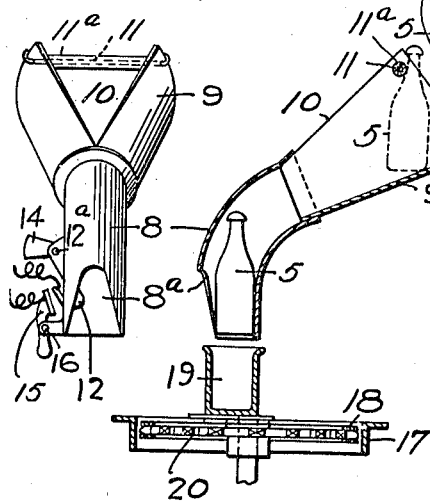
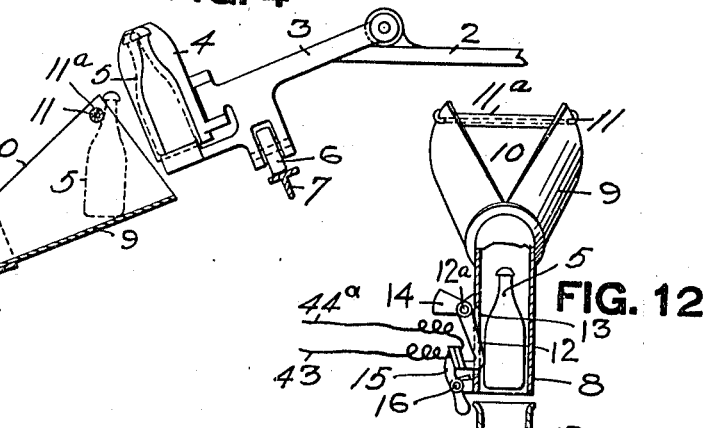
WITNESSES.
INVENTOR.

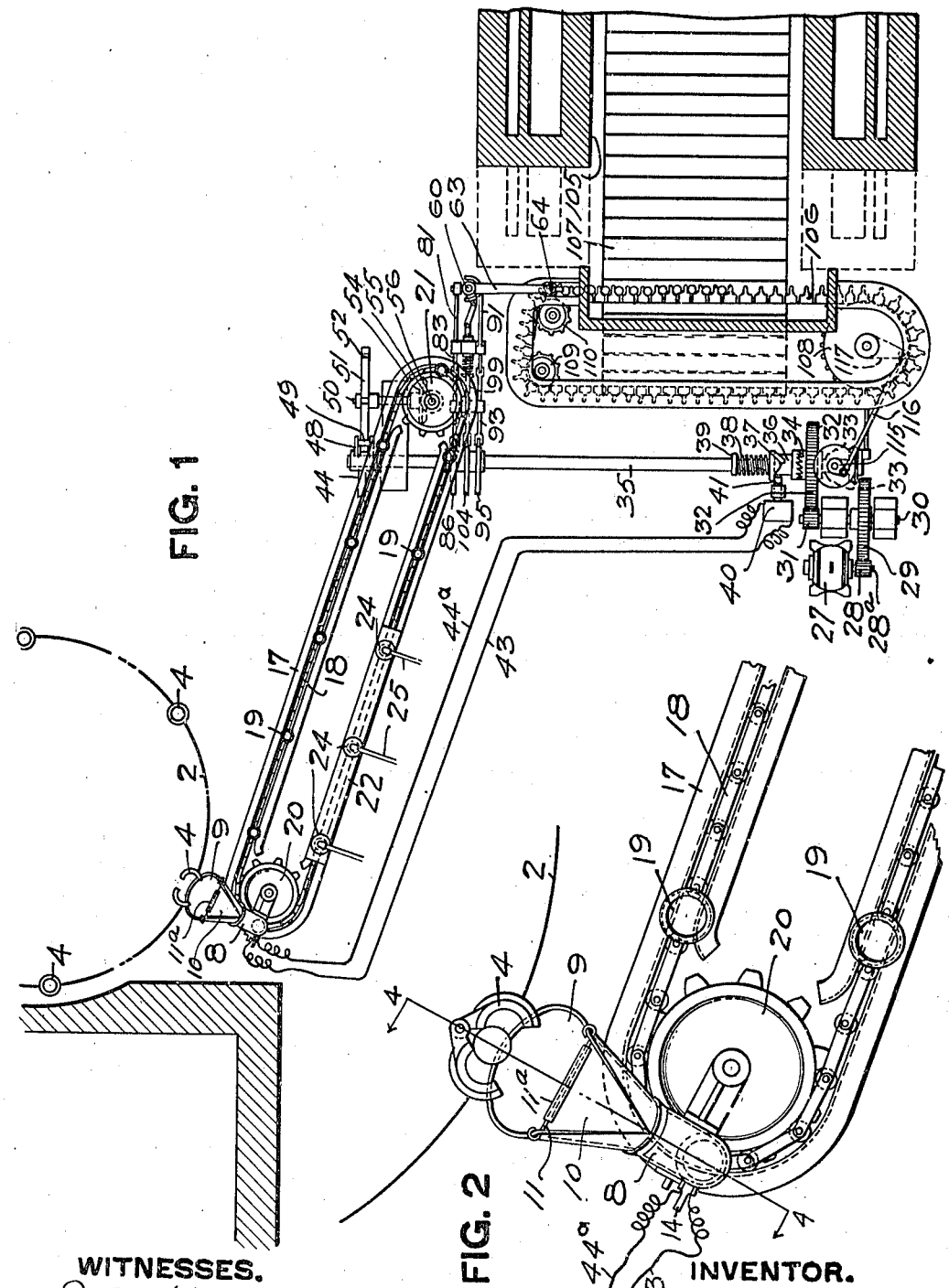

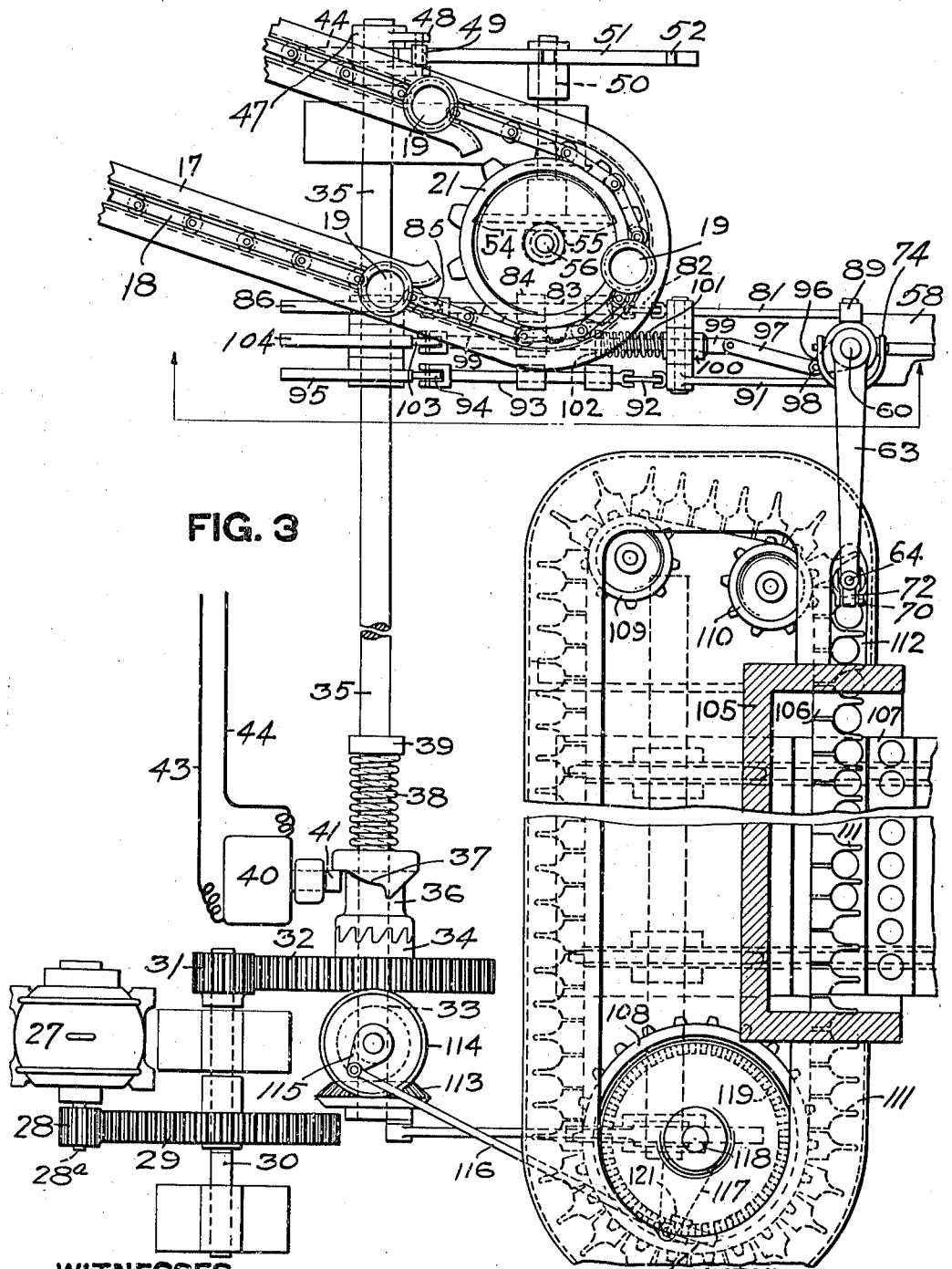

V. MULHOLLAND.
APPARATUS FOR HANDLING GLASSWARE.
APPLICATION FILED JUNE 24, 1908.

1,053,631.

Patented Feb. 18, 1913.

5 SHEETS—SHEET 4.

WITNESSES.

INVENTOR.

V. MULHOLLAND.
APPARATUS FOR HANDLING GLASSWARE.
APPLICATION FILED JUNE 24, 1908.

1,053,631.

Patented Feb. 18, 1913.
5 SHEETS—SHEET 5.

WITNESSES.
J. R. Keller
Robert C. Totten

INVENTOR.
Vergil Mulholland
By Kay & Totten
attorneys

UNITED STATES PATENT OFFICE.

VERGIL MULHOLLAND, OF EDGEWOOD, PENNSYLVANIA, ASSIGNOR TO HEYL & PATTERSON, INC., OF PITTSBURGH, PENNSYLVANIA, A CORPORATION OF PENNSYLVANIA.

APPARATUS FOR HANDLING GLASSWARE.

1,053,631.  Specification of Letters Patent.  Patented Feb. 18, 1913.

Application filed June 24, 1908. Serial No. 440,203.

*To all whom it may concern:*

Be it known that I, VERGIL MULHOLLAND, a resident of Edgewood, in the county of Allegheny and State of Pennsylvania, have invented a new and useful Improvement in Apparatus for Handling Glassware; and I do hereby declare the following to be a full, clear, and exact description thereof.

My invention relates to apparatus for handling glassware, the object of the invention being to provide for the handling of the ware quickly and expeditiously in the transfer of the ware from the mold to the leer.

To these ends my invention comprises the novel features hereinafter set forth and claimed.

Figure 6:
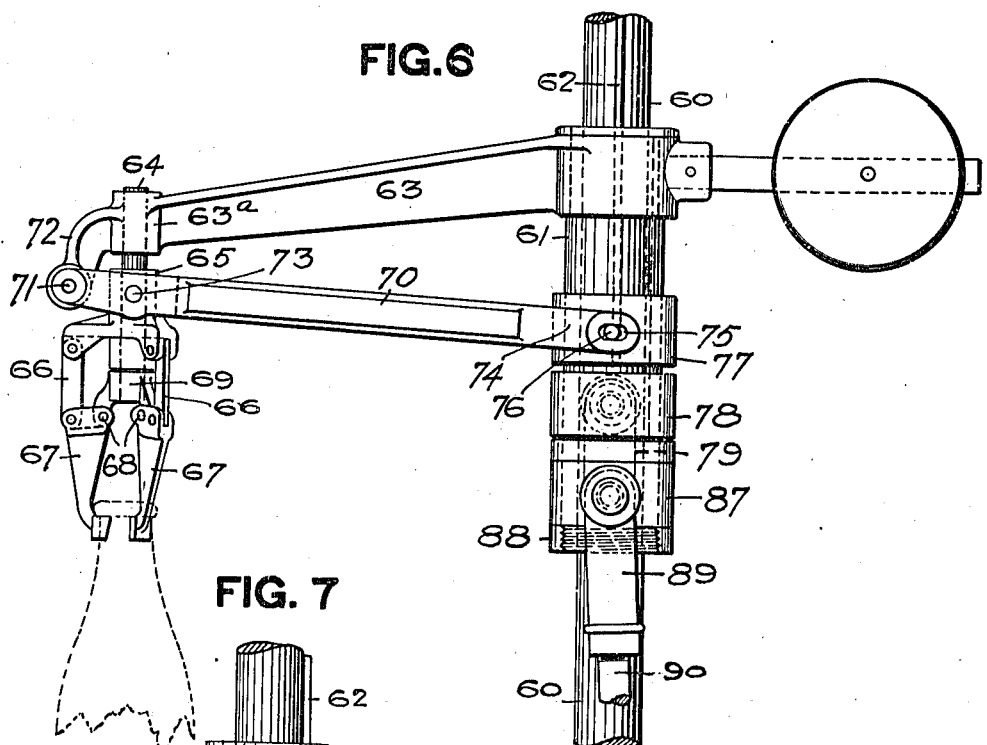
Figure 7:
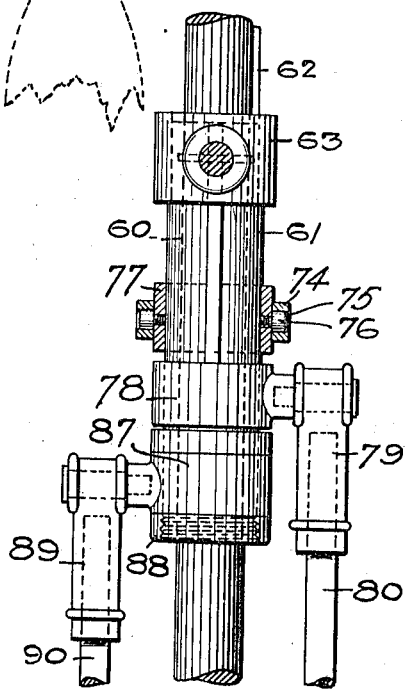
Figure 8:
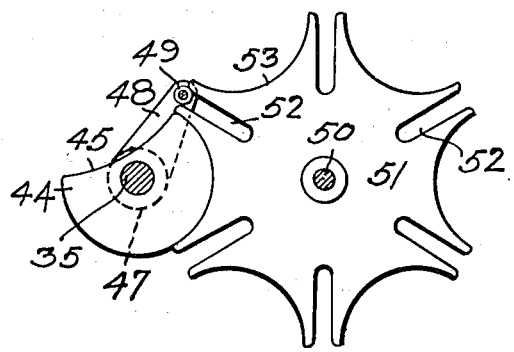
Figure 9:
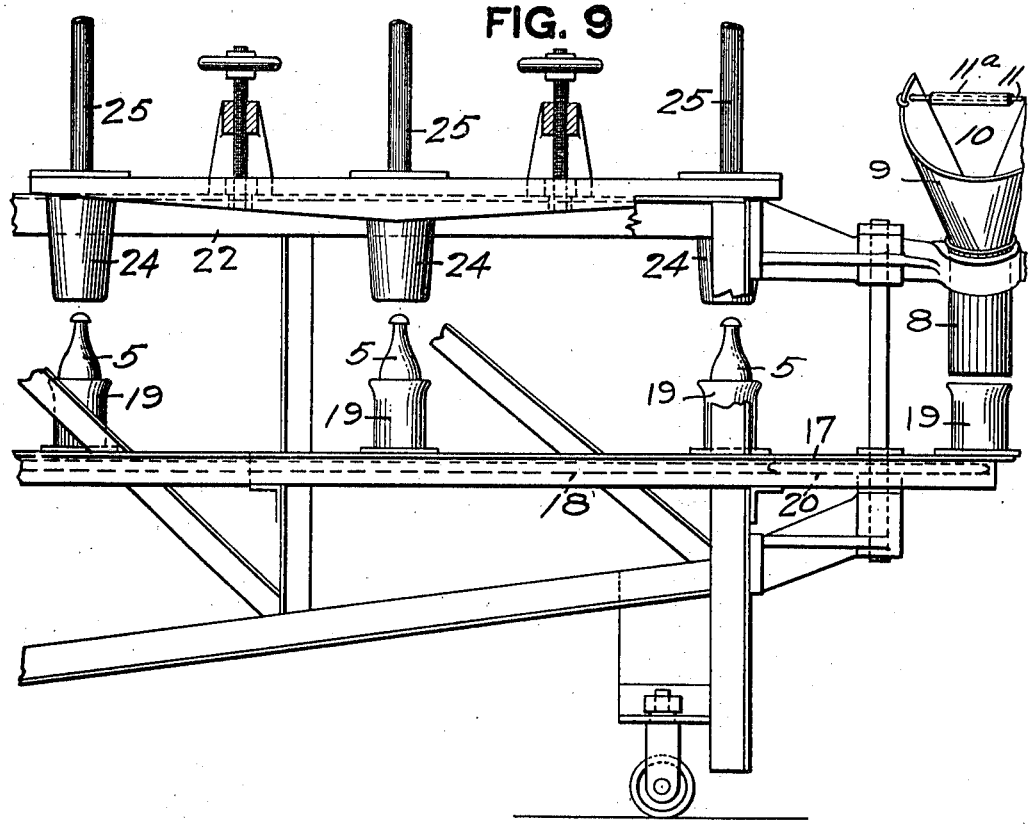
Figure 10:
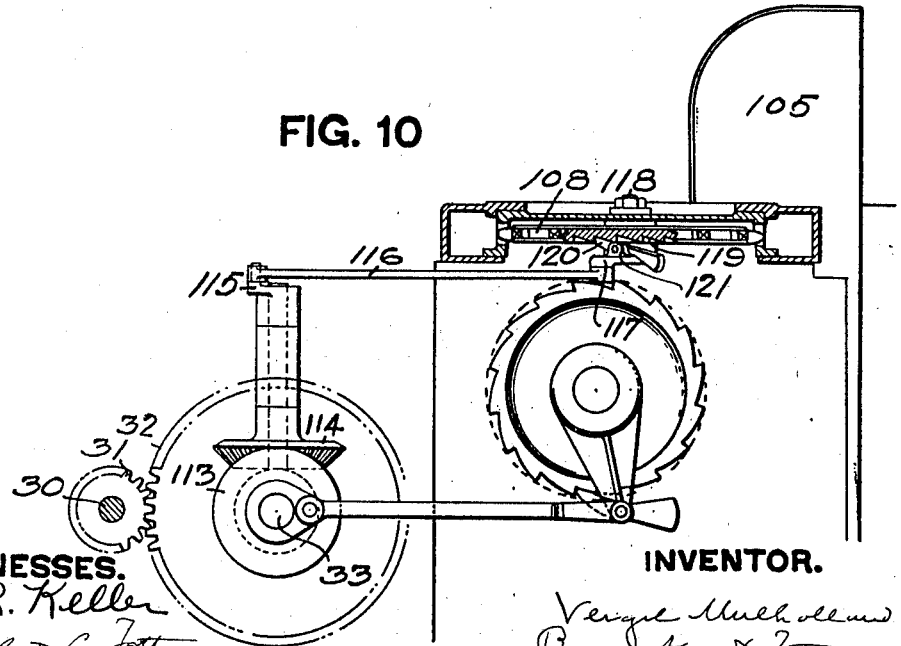

Referring to the drawings Figure 1 is a plan view of my improved apparatus; Fig. 2 is an enlarged detail of the chute for receiving the ware from the mold; Fig. 3 is an enlarged plan view of the mechanism for transferring the ware from the conveyer to the leer; Fig. 4 is an enlarged section on the line 4—4, Fig. 2; Fig. 5 is a side elevation of the inner end of the conveyer showing the apparatus for transferring the ware from the conveyer to the leer; Fig. 6 is an enlarged view of the transfer device; Fig. 7 is an enlarged detail; Fig. 8 is a detail of intermittent drive; Fig. 9 is a side view of the fire polisher; Fig. 10 is an enlarged view of the mechanism for the intermittent feed of the leer conveyer; Fig. 11 is an end view of the chute; and Fig. 12 is an end view partly in section.

I have illustrated my invention as used in connection with a molding apparatus in which the ware is discharged by gravity from the mold, the mold opening automatically as the revolving table carrying the same comes around into proper position. I have not deemed it necessary, however, to illustrate such molding apparatus in detail but have simply illustrated the same in diagrammatic form, as my invention pertains in no way to such molding apparatus. Accordingly the numeral 2 designates the rotary table of such molding apparatus and hinged to said table is the arm 3 which carries the partible mold 4, said mold in this instance being for a form suitable for molding a bottle 5. The arm 3 has the roller 6 which is adapted to travel on the track 7, said track being arranged in such a way as to provide for the tilting of the mold in the manner indicated in Fig. 4, while at the same time the mold is opened automatically to allow the bottle to be discharged therefrom. At the point where the mold 4 opens to discharge the bottle is located the chute 8 which has the flaring mouth portion 9 cut away, as at 10. Extending across the mouth of the mouth portion 9 at the upper end thereof is the deflector rod 11 which may be provided with the covering 11$^a$ of asbestos, or other suitable material. The mouth piece 9 is arranged at the proper angle to receive the bottle as it is discharged from the mold and said mouth piece fits into the curved chute 8. The chute 8 is cut away, as at 8$^a$, to permit of the travel of the bottle as fully hereinafter set forth. A contact arm 12 is pivoted at 12$^a$ to the chute 8, said arm entering said chute through a slot 13 and counterbalanced or weighted by the end portion 14 so that said contact arm is normally in position within the chute to be in the path of the descending bottle and forced outwardly thereby. A contact finger 15 is pivoted at 16 to the chute and the contact arm 11 is adapted to be forced outwardly by the descending bottle so as to contact with the contact finger 15 and so form the electrical circuit hereafter referred to.

Arranged in proper position with reference to the chute 8 is the frame 17 which forms the support and guide-way for the endless chain 18 which carries at intervals the cups 19. The chain 18 passes around the sprocket wheels 20 and 21 at opposite ends of the frame 17. The cups 19 are adapted to be brought around in position to receive the bottle as it drops from the chute 8, the chain 18 being driven intermittently for this purpose, as will more fully hereinafter appear. A frame 22 is arranged above the frame 17 and supported by the frame 22 are the burners 24 which are supplied with air and gas by means of the pipe 25. These burners 24 are upon the order of a Bunsen burner and the flame is discharged downwardly so as to strike the upper end of the bottles carried by the cups 19, said burners being arranged in position to act upon the said bottles when they stop in their intermittent movement, as provided for, so that the bottles are fire-polished as they are carried intermittently to the opposite end of the frame 17 where they are transferred to the leer, as fully hereinafter set forth.

Power to operate the apparatus, as a whole, is derived from the motor 27. The pinion 28 on the motor shaft 28$^a$ meshes with the gear wheel 29 on the shaft 30. The pinion 31 on the shaft 30 meshes with the gear wheel 32 on the shaft 33. The shaft 33 carries the clutch 34. A shaft 35 in line with the shaft 33 has the slidable clutch 36, said clutch having the cam 37. A spring 38 is interposed between the clutch 36 and the collar 39 on the shaft 35, said spring acting to normally hold the clutch 36 in engagement with the clutch 34. A solenoid 40 has the roller 41 which is adapted to engage the cam 37 for the purpose of withdrawing the clutch 36 in the manner fully hereinafter set forth. Wires 43 and 44$^a$ are connected with the solenoid and to the contact arm 11 and contact finger 15 so that when the said arm and finger are brought into contact by the descending bottle the solenoid 40 will be withdrawn, permitting the spring 38 to act to throw the clutch 36 into engagement with the clutch 34.

To give the intermittent movement to the chain 18 the shaft 35 carries at its outer end the disk 44, said disk being cut away, as at 45. The disk 44 has the hubs 47 and extending from said hubs are the arms 48 within which the roller 49 is mounted. A shaft 50 carries the wheel 51 which is provided with the deep teeth or pockets 52 at intervals. The periphery of the wheel 51 is provided with the depressions 53. Secured to the shaft 50 is the beveled gear 54 which meshes with the bevel gear 55 on the vertical shaft 56 which carries the sprocket wheel 21. As the shaft 35 rotates the disk 44 will rotate and the roller 49 carried by said disk will enter the pockets 52 and the wheel 53 will be rotated, the said roller 49 descending within the pockets 52 withdrawing therefrom during the rotation of the wheel 53 whereby an intermittent movement is imparted to said wheel 53 and consequently to the chain 18. Upon each movement of the chain 18 one of the cups 19 is moved around in position at a standstill directly beneath the chute 18 to receive a bottle therefrom, while at the same time a cup carrying a bottle also comes around in position to be lifted from the chain 18 by the mechanism about to be described. When the disk 44 is within the depressions 53 the wheel 51 is held against rotation.

A housing 58 has the bearings 59 for the vertical shaft 60. Encircling the shaft 60 is the sleeve 61 which is keyed to said shaft by the key 62 but said sleeve is adapted to move up and down thereon. A frame 63 is connected to the upper end of the sleeve 61. At the outer end of said frame is the bearing 63$^a$ for the shaft 64. A casting 65 encircles the shaft 64 and is adapted to move up and down thereon. This casting 65 has the links 66 depending therefrom and said links are connected to the jaws 67. These jaws 67 are hinged as at 68 to the stationary collar 69 on the lower end of the shaft 64. A lever 70 is fulcrumed at 71 on the bracket 72 of the frame 62 and said lever is pivotally connected to the casting 65 at 73. The inner end of the lever 70 is bifurcated, as at 74, and in the ends of said lever are the slots 75 with which the pins 76 on the collar 77 engage. This collar 77 is slidable on the sleeve 61. Below the collar 77 is the collar 78 which is slidable on the sleeve 61 and said collar is keyed to said sleeve so as to rotate therewith. The collar 78 carries the socket 79 and a rod 80 fits within said socket. The lower end of the rod 80 is connected to the bell crank 81, the opposite end of said bell crank being connected to the link 82. This link is connected to the rod 83 sliding in guides 84. At the outer end of the rod 83 is the idle roller 85 which is adapted to move in contact with the cam 86 on the shaft 35.

A collar 87 is keyed to the sleeve 61 so as to be movable up and down thereon, the movement of said collar being controlled by the ring 88 secured to said sleeve. The collar 87 carries a socket 89 into which the rod 90 is inserted, the lower end of the rod being connected with a bell crank 91 connected at its opposite end to the link 92. The link 92 is connected to the rod 93 and said rod carries the idle roller 94 which is adapted to engage with the cam 95 on the shaft 35.

Secured to the lower end of the shaft 60 is the crank 96. An arm 97 is connected to the crank pin 98 and at its opposite end said arm is connected to the rod 99 adapted to slide in the bearings 100. A spring 101 is interposed between a collar 102 on said rod and the bearing 100. At the outer end of the rod 99 is the idle roller 103 which is adapted to engage the cam 104 on the shaft 35. The transfer mechanism just described is adapted to be used in connection with a device for conveying the ware into the leer 105. A conveyer 106 is arranged with reference to the leer so as to arrange the ware in rows upon the pans 107 of the leer and this conveyer comprises an endless chain passing around the sprocket wheels 108, 109 and 110. Flights 111 are secured to the conveyer 106 and the ware is to be arranged between the flights of the conveyer and passed into the leer by the opening 112 at the side of the leer near the end. An intermittent movement must be imparted to this conveyer 106 and this intermittent movement is provided for in the following manner: On the shaft 33 is the beveled pinion 113 which meshes with the beveled gear 114. On this beveled gear 114 is the crank 115. A rod 116 connects the crank 115 with the crank 117 on the vertical shaft 118 on which the sprocket wheel 108 is secured. On the bottom face of the sprocket wheel 108 are the ratchet teeth 119. A pawl 120 pivoted on the bracket 121 is adapted to engage the ratchet face of the sprocket wheel 108 and so impart an intermittent movement to said sprocket wheel and consequently to the conveyer 106.

When my improved apparatus is in use the bottle contained in the mold 4 will be discharged by the tilting and opening of said mold so as to fall in the position indicated in Fig. 4 into the mouth of the chute. In order to insure the bottle descending the chute with its bottom down the rod 10 is provided with which the neck of the bottle in dropping comes in contact so that the heavier portion of the bottle being below the neck the weighted end will carry the bottle down so that it will pass from the chute in the position indicated in Fig. 4. As the bottle descends the chute it comes in contact with the arm 11 and forces said arm outwardly, bringing said arm into contact with the contact finger 15. This forms the circuit to the solenoid 40 and for the purpose hereinafter stated. The bottle drops into the cup 19 in position to receive it and as soon as said bottle is deposited within the cup 19 movement is imparted to the conveyer 18 which moves the cup around into position where the bottle is acted on by the fire polisher or burner 24, while another empty cup is brought around in position beneath the chute 8 to receive the next bottle. This intermittent movement is provided for by the power imparted to the shaft 35 and through it to the shaft 56. Just as soon as the electrical circuit is formed by the passage of the bottle through the chute 8 the solenoid 40 is withdrawn, allowing the spring 38 to throw the clutch 36 into engagement with the clutch 34. During the time that the bottle was in contact with the contact arm 11 the solenoid 40 was in contact with the cam 37 of the clutch 36 and as said cam rotates the clutch 37 is withdrawn from the clutch 34, stopping the travel of the conveyer 18 until the bottle has dropped into the cup 19, whereupon the electrical circuit to the solenoid is broken and the solenoid withdrawn, permitting the spring 38 to force the clutch 36 into engagement with the clutch 34. Further movement is then imparted to the conveyer 18 and the next empty cup is moved around in position to receive the next bottle, while the cup just charged passes around in position to be operated upon by the flame of the fire polisher. The cup thus passes by an intermittent movement from one fire polisher to the other until it has been properly fire polished, whereupon it continues around until it reaches the point where it is to be picked up from the cup and carried over and deposited between the lights of the conveyer 106. The apparatus is so timed that the frame 62 will be in position over the cup so as to lift the ware therefrom. Accordingly the cam 86 is in such position with reference to the idle roller 85 that the rod 83 will be forced back in such position as to cause the bell crank 81 to raise the rod 80 and with it the collar 78. The collar 78 lifts the lever 70 and the jaws 67 are opened. With the frame 62 in this position the cam 86 having revolved moves the rod 83 so as to permit the rod 80 to lower and the collars 76 and 78 are lowered. This movement of the collar 76 through the lever 70 acts to cause the jaws 67 to grasp the upper end of the bottle contained within the cup. The cam 95 meanwhile has moved around in position to so act upon the rod 93 to operate the bell crank 91 to lift the rod 90 and with it the sleeve 61. The sleeve 61 moves up the shaft 60 and carries with it the frame 62. This upward movement of the sleeve 61 continues until the bottle has been lifted clear of the cup, whereupon the cam 104 has moved around in such position with reference to the idler 103 on the rod 99 as to move said rod to impart a rotary movement through the crank 96 to the shaft 60. This rotary movement imparted to the shaft 60 carries the frame 62 around into the position indicated in full lines, Fig. 3, bringing the bottle over into position above the conveyer 106 between the flights of said conveyer. At this point the frame 62 is to be lowered and accordingly the cam 95 has traveled around in such position as to effect the lowering of the sleeve 61, whereupon the bottle is lowered onto the conveyer 106. To release the bottle so lowered it is necessary to open the jaws 67 and accordingly the cam 86 has moved around into such position with reference to the idler 85 that the rod is raised and the sleeve 76. This raising of the sleeve 76 lowers the casting 65 and the jaws 67 are thrown apart, releasing the bottle. In this manner the bottle is deposited between the flights of the conveyer 106 and this conveyer 106 now moves one step to provide for the deposit of the next bottle upon the conveyer. This intermittent movement of the conveyer 106 is provided for by the intermittent movement imparted to the sprocket wheel 108 through the pawl and ratchet mechanism hereinbefore described. It is now necessary to swing the frame 62 around in position to bring the jaws into position to receive and grasp another bottle. Accordingly the cam 104 has rotated in such position with reference to the idler 103 as to impart the rotary movement to the shaft 60 to swing the frame 62 around in position to be lowered to grasp the next bottle which has been brought around by the conveyer 18.

In this manner I provide for the mechanical handling of the glassware as it is conveyed from the mold and do away with the manual labor heretofore required for the transfer of the ware from the mold to the leer carrier. The whole device works automatically, the action of the bottle in dropping by gravity from the mold into the cup acting to control the movement of the conveyer and all the parts being so timed as to coöperate with each other in such a way as to produce the result described. The bottle as received from the mold is deposited in an upright position in the cups and it is not necessary to carry it around in an inverted form but it is in an upright position from the start and continues in this position until deposited in the leer.

What I claim is:

1. In apparatus for handling glassware, the combination of a chute, a conveyer at the discharge end of said chute to receive the article, mechanism for imparting an intermittent movement to said conveyer, and means in the path of said article of glassware during its passage through said chute to operate said mechanism for imparting an intermittent movement to said conveyer.

2. In apparatus for handling glassware, the combination of a chute, a conveyer at the discharge end of said chute to receive the article, mechanism for imparting an intermittent movement to said conveyer, means for operating said mechanism electrically, and means in the path of said article of glassware in its passage through said chute to form an electric circuit to operate said mechanism for imparting an intermittent movement to said conveyer.

3. In apparatus for handling glassware, the combination of a chute, a conveyer at the discharge end of said chute to receive the article, mechanism for imparting an intermittent movement to said conveyer, means for operating said mechanism electrically, a contact arm in the path of said bottle in its passage through said chute, and means for forming an electrical circuit by said contact device for said electrical means to operate the mechanism for imparting an intermittent movement to said conveyer.

4. In apparatus for handling glassware, the combination of a chute, a conveyer at the discharge end of said chute to receive the article, mechanism for imparting an intermittent movement to said conveyer, means operated electrically for operating said mechanism, a contact arm mounted on said chute and in the path of the article of glassware descending said chute, a contact finger on said chute with which said contact arm engages, and wires connecting said contact arm and said contact finger with said means for operating said intermittent mechanism to impart an intermittent movement to said conveyer.

5. In apparatus for handling glassware, the combination of a chute, a conveyer at the discharge end of said chute to receive the article, mechanism for imparting an intermittent movement to said conveyer, a solenoid, mechanism controlled by said solenoid for operating said intermittent mechanism, and means for closing the circuit to said solenoid in the path of the article of glassware in its passage through said chute.

6. In apparatus for handling glassware, the combination of a chute, a conveyer at the discharge end of said chute to receive the article, a power driven shaft, a second shaft, means for throwing said second named shaft into engagement with said power shaft, connections between said second shaft and mechanism for imparting an intermittent movement to said conveyer, a solenoid controlling the engagement of said second shaft with said power shaft, and means operated by the movement of the article of glassware through said chute to complete the circuit to said solenoid.

7. In apparatus for handling glassware, the combination of a chute, a conveyer at the discharge end of said chute to receive the article, a power shaft, a second shaft in alinement therewith, clutch devices carried by said shafts, connections between said second shaft and mechanism for imparting an intermittent movement to said conveyer, a cam on said second shaft, a solenoid adapted to engage said cam, and means operated by the movement of said article of glassware through said chute to complete the circuit to said solenoid.

8. In apparatus for handling glassware, the combination of a chute, a conveyer at the discharge end of said chute to receive the article, a power shaft, a second shaft in alinement therewith, clutch connections between said shafts, a solenoid controlling said clutch connections, a disk on said second shaft, a roller carried by said disk, a wheel having pockets therein with which said roller is adapted to engage in succession, connections between said wheel and a shaft for driving said conveyer, and means operated by the movement of said glassware through said chute to complete the circuit to said solenoid.

9. In apparatus for handling glassware, the combination of a chute, means for delivering the article of glassware right end up from said chute, a conveyer at the discharge end of said chute, receptacles on said conveyer adapted to receive the article of glassware delivered from said chute, mechanism for imparting an intermittent movement to said conveyer, and a fire polishing device above said conveyer at the positions of rest of said article of glassware.

10. In apparatus for handling glassware, the combination of a chute, means for delivering the article of glassware right end up from said chute, a conveyer at the discharge end of said chute, receptacles on said conveyer to receive the article of glassware, mechanism for imparting an intermittent movement to said conveyer, fire polishing burners arranged above said conveyer in position to direct the flame onto said glassware at points of rest of said glassware.

11. In apparatus for handling glassware, a vertical rotary shaft, a swinging frame slidable on said shaft, a lever, connections between said lever and a sliding member on said shaft, said lever being fulcrumed to said frame, ware-grasping arms carried by said frame, connections between said lever and said arms for opening and closing same, and mechanism for raising and lowering said frame and said lever.

12. In apparatus for handling glassware, the combination of a vertical rotary shaft, a swinging frame slidable on said shaft, ware-grasping jaws carried by said frame, a crank on said shaft, a longitudinally movable rod connected to said crank, and a cam moving in the path of said rod.

13. In apparatus for handling glassware, the combination of a vertical rotary shaft, a swinging frame slidable on said shaft, ware-grasping jaws carried by said frame, a crank on said shaft, a spring actuated longitudinally movable rod connected to said crank, and a cam moving in the path of said rod.

14. In apparatus for handling glassware, the combination of a vertical rotary shaft, a swinging frame slidable on said shaft, ware-grasping jaws carried by said frame, a sleeve on said frame, a slidable collar on said shaft, a cam, and means operated by said cam for raising and lowering said collar.

15. In apparatus for handling glassware, the combination of a vertical rotary shaft, a swinging frame slidable on said shaft, ware-grasping device carried by said frame, a sleeve on said frame, a collar below said sleeve on said shaft, a rod connected to said collar, a bell crank connected to said rod, a longitudinally movable rod connected at the opposite end of said bell crank, and a cam in the path of said rod.

16. In apparatus for handling glassware, the combination of a vertical rotary shaft, a swinging frame slidable on said shaft, ware-grasping arms carried by said frame, a lever fulcrumed on said frame to open and close said arms, a sleeve on said frame engaging said shaft, a collar on said shaft, connected to said lever, two collars on said sleeve below said lever collar, rods connected to said collars, bell cranks connected to the lower ends of said rods, slidable rods connected to the opposite end of said bell crank, and cams in the path of said slidable rod.

In testimony whereof, I the said VERGIL MULHOLLAND have hereunto set my hand.

VERGIL MULHOLLAND.

Witnesses:
M. D. VOGEL,
ROBERT C. TOTTEN.